*(12)* United States Patent
Platt

(10) Patent No.: US 7,196,258 B2
(45) Date of Patent: Mar. 27, 2007

(54) AUTO PLAYLIST GENERATION WITH MULTIPLE SEED SONGS

(75) Inventor: John C. Platt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/255,365

(22) Filed: Oct. 21, 2005

(65) Prior Publication Data

US 2006/0032363 A1     Feb. 16, 2006

Related U.S. Application Data

(63) Continuation of application No. 10/158,674, filed on May 30, 2002, now Pat. No. 6,987,221.

(51) Int. Cl.
*G06F 17/00* (2006.01)

(52) U.S. Cl. ............... 84/600; 84/601; 700/94; 708/172; 707/102

(58) Field of Classification Search ............ 84/600, 84/601, 615, 647, 653, 634, 666; 700/94; 708/172; 707/102, 104.1
See application file for complete search history.

(56) References Cited

U.S. PATENT DOCUMENTS

| | | | |
|---|---|---|---|
| 5,616,876 A * | 4/1997 | Cluts | ............ 84/609 |
| 5,721,829 A | 2/1998 | Dunn | |
| 6,252,947 B1 | 6/2001 | Diamond | |
| 6,526,411 B1 * | 2/2003 | Ward | ............ 707/102 |
| 2003/0135513 A1 * | 7/2003 | Quinn et al. | ............ 707/102 |

OTHER PUBLICATIONS

Logan, Beth, et al. "A Content-Based Music Similarity Function" Cambridge Research Laboratory. Technical Report Series. Jun. 2001.*
Adam Field, et al.; "Personal DJ, an Architecture for Personalised Content Delivery"; WWW 10, May 1-5, 2001; pp. 1-8; Hong Kong.
David B. Hauver, et al.; "Flycasting: Using Collaborative Filtering to Generate a Playlist for Online Radio"; 2001; pp. 1-8.
Loren Terveen, et al.; "Specifying Preferences Based On User History"; CHI 2002, Apr. 20-25, 2002; pp. 315-322; Minneapolis, Minnesota, USA.

(Continued)

*Primary Examiner*—Lincoln Donovan
*Assistant Examiner*—David S. Warren
(74) *Attorney, Agent, or Firm*—Amin, Turocy & Calvin, LLP

(57) ABSTRACT

The present invention relates to systems and/or methods that generate playlist(s) for a library or collection of media items via selecting a plurality of seed items, at least one of which is an undesirable seed item. Some of the seed items are desirable indicating that a user prefers additional media items similar to the desirable seed items and others are undesirable indicating that the user prefers additional media items dissimilar to the undesirable seed items. Additionally, the seed items can be weighted to establish a relative importance of the seed items. The invention compares media items in the collection with the seed items and determines which media items are added into the playlist by computation of similarity metrics or values. The playlist can be regenerated by adding desirable seed items to the playlist and removing media items from the playlist (e.g., undesirable seed items).

20 Claims, 15 Drawing Sheets

OTHER PUBLICATIONS

Murray, et al., "Graphics Data," http://netghost/narod.ru/gff/graphics/book/ch01_03.htm, 1996.

European Search Report, EP30047RK900peu, mailed Feb. 11, 2005.

John C. Platt, et al., Learning a Gaussian Process Prior for Automatically Generating Music Playlists, Advances in Neural Information Processing Systems, Dec. 9-14, 2002, pp. 1425-1432, Vancouver, Canada.

D. Barber, et al., Gaussian Processes for Bayesian Classification via Hybrid Monte Carlo, NIPS, 1997, pp. 340-346, vol. 9.

K.P. Bennett, et al., Semi-supervised Support Vector Machines, NIPS, 1998, pp. 368-374, vol. 11.

J.S. Breese, et al., Empirical Analysis of Predictive Algorithms for Collaborative Filtering, In Uncertainty in Artificial Intelligence, 1998, pp. 43-52.

J. Baxter, A Bayesian/information theoretic model of bias learning, Machine Learning, 1007, pp. 7-40.

R. Caruana, Learning many Related Tasks at the Same Time with Backpropagation, NIPS, 1995, pp. 657-664, vol. 7.

V. Castelli, et al., The Relative Value of Labeled and Unlabeled Samples in Pattern Recognition with an Unknown Mixing Parameter, IEEE Trans. Info. Theory, 1996, pp. 75-85, vol. 42—No. 6.

N.A.C. Cressie, Statistics for Spatial Data, 1993, Wiley, New York.

N. Cristianini, et al., On optimizing kernel alignment, NeuroCOLT, 2001.

D. Goldberg, et al., Using Collaborative Filtering to Weave an Information Tapestry, CACM, pp. 61-70, 1992, vol. 35—No. 12.

T. Minka, et al., Learning How to Learn is Learning with Points Sets, MIT Media Laboratory, 1997, 7 pages.

M. Pazzani, et al., Learning and Revising User Profiles: The Identification of Interesting Web Sites, Machine Learning, 1997, pp. 313-331, vol. 27.

P.S. R. S. Rao, Variance Components Estimation: Mixed models, Methodologies and Applications, 1997, Chapman & Hill.

S. Thrun, Is Learning the N-th Thing any Easier than Learning the First?, NIPS, 1996, pp. 640-646, vol. 8.

C.K.I. Williams, et al., Gaussian Processes for Regression, NIPS, 1996, pp. 514-520, vol. 8.

* cited by examiner

AUTO PLAYLIST GENERATION WITH MULTIPLE SEED SONGS

CROSS-REFERENCE TO RELATED APPLICATIONS

This application is a continuation of U.S. patent application Ser. No. 10/158,674, which was filed on May 30, 2002 now U.S. Pat. No. 6,987,221, and entitled, "AUTO PLAYLIST GENERATION WITH MULTIPLE SEED SONGS." The entirety of the aforementioned application is hereby incorporated by reference.

TECHNICAL FIELD

The present invention relates generally to digital media, and more particularly to systems and methods for playlist generation.

BACKGROUND OF THE INVENTION

With the proliferation of digital media, it is common for both home personal computer (PC) users and professionals to access and manage large numbers of media items (e.g., digital audio, digital video, electronic books, digital images and the like). Digital media permits users to have access to numbers and amounts of media on a scale not previously seen. Digital media can be stored and accessed on storage devices such as hard drives, DVD drives and the like and can also be stored and accessed across network(s) (e.g., Internet). Digital media is also employed in portable devices such as personal digital assistants (PDA), portable audio players, portable electronic book readers and the like.

However, such proliferation of media has also created problems in that the vast amounts of available media can overwhelm users. Users can find it difficult to organize, categorize and maintain large amounts of media. As an example, a single compact disk (CD) containing MPEG layer three (mp3) digital audio files can include about 140 songs. In contrast, a conventional compact disc-digital audio (CDDA) disc or audio tape typically includes about 10 songs. A user can generally remember the 10 songs on an audio tape but is not likely to remember all 140 songs on the mp3 CD. Furthermore, portable digital audio devices can include 10 gigabytes or more of storage which permits for storing about 2,000 compressed digital songs. Additionally, storage device capacities are constantly increasing further affording for storing ever greater numbers of media items (e.g., an 80 gigabyte drive can generally store 16,000 songs) thereby exacerbating the difficulties related to accessing and categorizing numerous media items.

Additionally, identifying media items that match user preferences (e.g., mood, likes, dislikes) is also difficult. Users typically prefer certain types or categories of media items at different times and/or occasions (e.g., after work, party, relaxing and the like). Consequently, a user is often required to remember or search through an entire collection of media items (e.g., songs) to locate appropriate song(s) that are coincident with his or her current mood. As the collection of media items grows, the level of effort required to effect such searching does as well.

One mechanism that is used to organize and identify media items is a playlist, which is simply a list of media items organized in a particular order. A user can create different playlists for different moods and/or styles (e.g., dance music, classical, big band, country and the like). Playlists are helpful in connection with organizing media items, but can be difficult to generate and maintain. Generally, a user is required to manually locate songs having similar properties (e.g., artist, country, heavy metal and the like) and combine them into a single playlist. Then, in order to modify or update the playlist (e.g., because new items have been added to the collection), the user is required to manually add or remove items from the playlist. Some approaches for automatically generating playlist(s) have been attempted, but generally result in playlists that inadequately represent preferences of user(s).

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present invention relates generally to systems and methodologies that facilitate generation of playlists. The invention can also facilitate organization and access to media items by identifying items similar to desirable characteristics and dissimilar to undesirable characteristics by analyzing user selectable seed items.

The present invention facilitates playlist generation for a library or collection of media items by permitting a user to select a plurality of seed items. Some of the seed items are selected as desirable indicating that the user prefers additional media items similar to the desirable seed items and others are selected as undesirable indicating that the user prefers additional media items dissimilar to the undesirable seed items. Additionally, the user can weight the seed items to establish a relative importance thereof. The invention compares media items in the collection with the seed items and determines which media items to be added to the playlist. The playlist can be regenerated by the user adding desirable seed items to the playlist and removing media items from the playlist (e.g., undesirable seed items).

Thus, the present invention reduces effort and time required by a user to generate a playlist that meets or is similar to desired characteristics or features by automatically generating a playlist based on seed items. Consequently, the user is not required to manually search through a collection of media items and select those items that meet the user's current mood or desire in order to generate a playlist.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
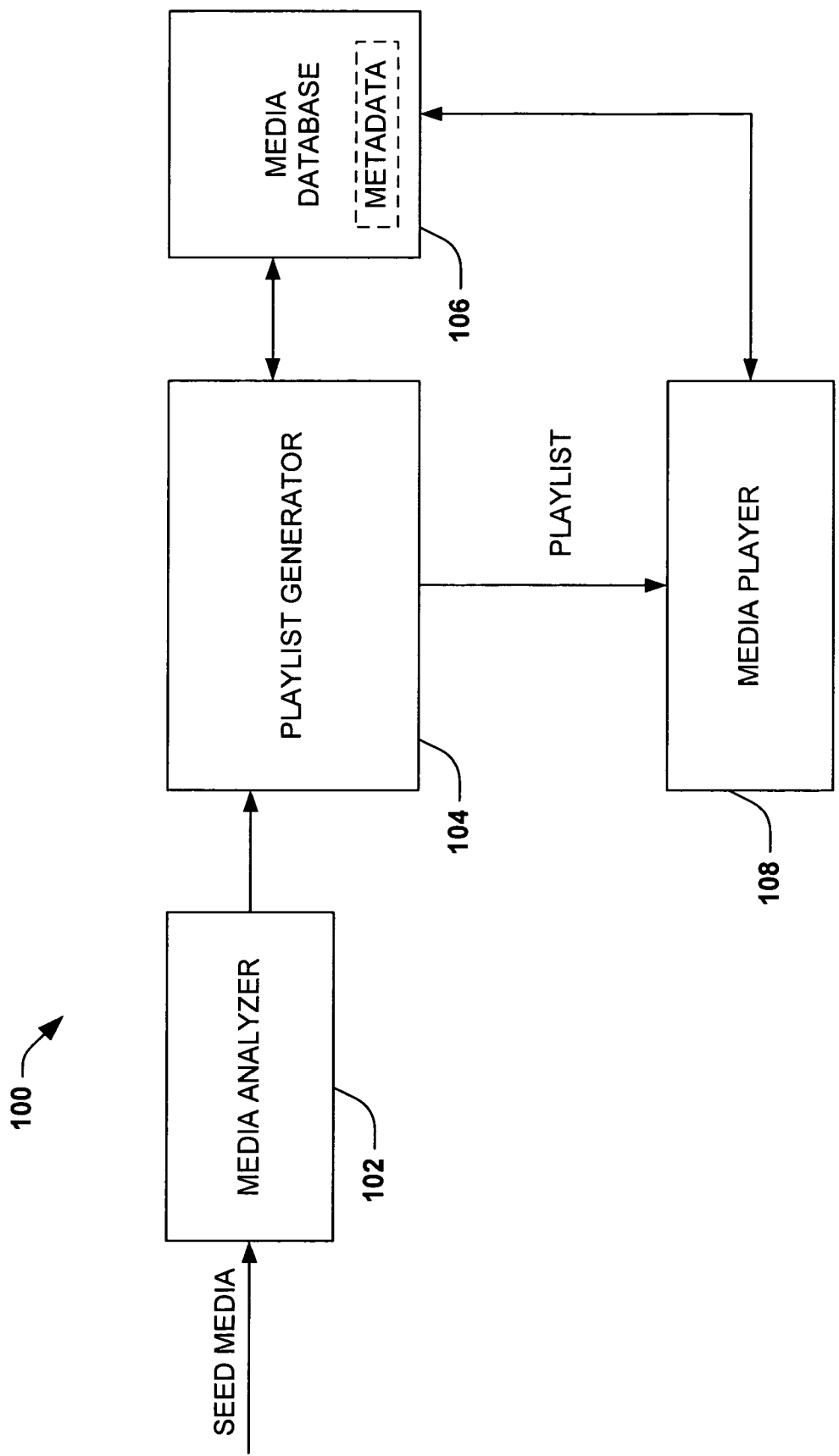
FIG. 1 is a block diagram of a system that facilitates playlist generation in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

It is to be appreciated that, for purposes of the present invention, any or all of the functionality associated with modules, systems and/or components discussed herein can be achieved in any of a variety of ways (e.g. combination or individual implementations of active server pages (ASPs), common gateway interfaces (CGIs), application programming interfaces (API's), structured query language (SQL), component object model (COM), distributed COM (DCOM), system object model (SOM), distributed SOM (DSOM), ActiveX, common object request broker architecture (CORBA), database management systems (DBMSs), relational database management systems (RDBMSs), object-oriented database management system (ODBMSs), object-relational database management systems (OR-DBMS), remote method invocation (RMI), C, C++, practical extraction and reporting language (PERL), applets, HTML, dynamic HTML, server side includes (SSIs), extensible markup language (XML), portable document format (PDF), wireless markup language (WML), standard generalized markup language (SGML), handheld device markup language (HDML), graphics interchange format (GIF), joint photographic experts group (JPEG), binary large object (BLOB), other script or executable components).

Referring initially to FIG. 1, a system 100 that facilitates playlist generation is depicted in accordance with an aspect of the present invention. The system 100 includes a media analyzer 102, a playlist generator 104, a media database 106 and a media player 108. The system 100 receives seed media or items and generates a playlist according to the seed items and the media database 106 without requiring a user to manually create the playlist.

The media analyzer 102 receives seed media or seed item(s) and analyzes the seed item(s) to generate a preference function. Generally, the seed item(s) are media items from a collection of media stored and/or maintained in the media database 106. However, the seed item(s) can be media items that are not a part of the media collection. The seed item(s) can be media such as, but not limited to, audio (e.g., songs), movies (e.g., AVI or MPEG files), documents, electronic books, images and the like. Then, after receiving the seed item(s), the media analyzer 102 obtains metadata corresponding to and characterizing the seed item(s). The metadata includes information that characterizes the seed items and can include, for example, artist, song title, movie title, author, genre (e.g., folk, jazz, new wave, rock and the like), mood, rhythm and the like. In some situations, the seed item(s) include or incorporate metadata (e.g., via a tag or block of information at a specific location in a file) such as, for example, ID3 tags which include information characterizing digital audio files (e.g., mp3). Alternately, metadata can be generated for the seed item(s) by analyzing aspects of the seed items such as, tempo, volume, instruments, vocals, in order to determine appropriate metadata for the respective seed item(s). Furthermore, in an alternate aspect of the invention, metadata is entered (e.g., by a user) without receiving seed items in order to characterize desired content.

In addition to providing a source for the metadata, the seed item(s) can also be weighted with a user preference according to a suitable scheme. One approach is to permit a user to set seed items as desirable or undesirable and weight the seed item(s) as, for example, "+1" for desirable and "−1" for undesirable. According to another approach, a user is permitted to assign or select weights according to categories such as for example, "strongly like, like, slightly like, slightly dislike and strongly dislike". Yet another approach is to permit users to assign numerical target preferences (e.g., by employing a slider) to the seed item(s) indicating their preferences. It is to be appreciated that any suitable scheme for indicating weight or preference in the present invention can be employed.

The weights (or target preferences) and metadata can be utilized by the media analyzer 102 to generate a preference function which generally indicates desired characteristics of which a playlist should be generated for. Additional description of generation of the preference function is described infra.

The playlist generator 104 receives the preference function from the media analyzer 102 and generates a playlist. The playlist generator 104 also receives metadata for media items in the media collection from the media database 106 in order to generate the playlist. The playlist generator 104 computes a preference for the media items using the preference function and inserts media items having more than a threshold amount of similarity into the playlist. After computing the preferences and inserting the most preferred media items, the playlist is sorted according to the estimated user preference such that most preferred media items are located at the top or early in the playlist and least preferred media items are located at the bottom or at the end of the playlist. Additionally, the desirable seed item(s) are inherently preferable and are generally placed at the beginning or top of the playlist.

The media player 108 receives the playlist from the playlist generator 104 and is operative to play media items identified in the playlist. The playlist contains a reference (e.g., filename or URL) for the items in the playlist, which the media player in turn employs to access the appropriate media items from the media database 106. The media player generally plays the media items in order (e.g., top to bottom) and can pause, skip forward, reverse and perform other suitable functions of media players.

Figure 2:
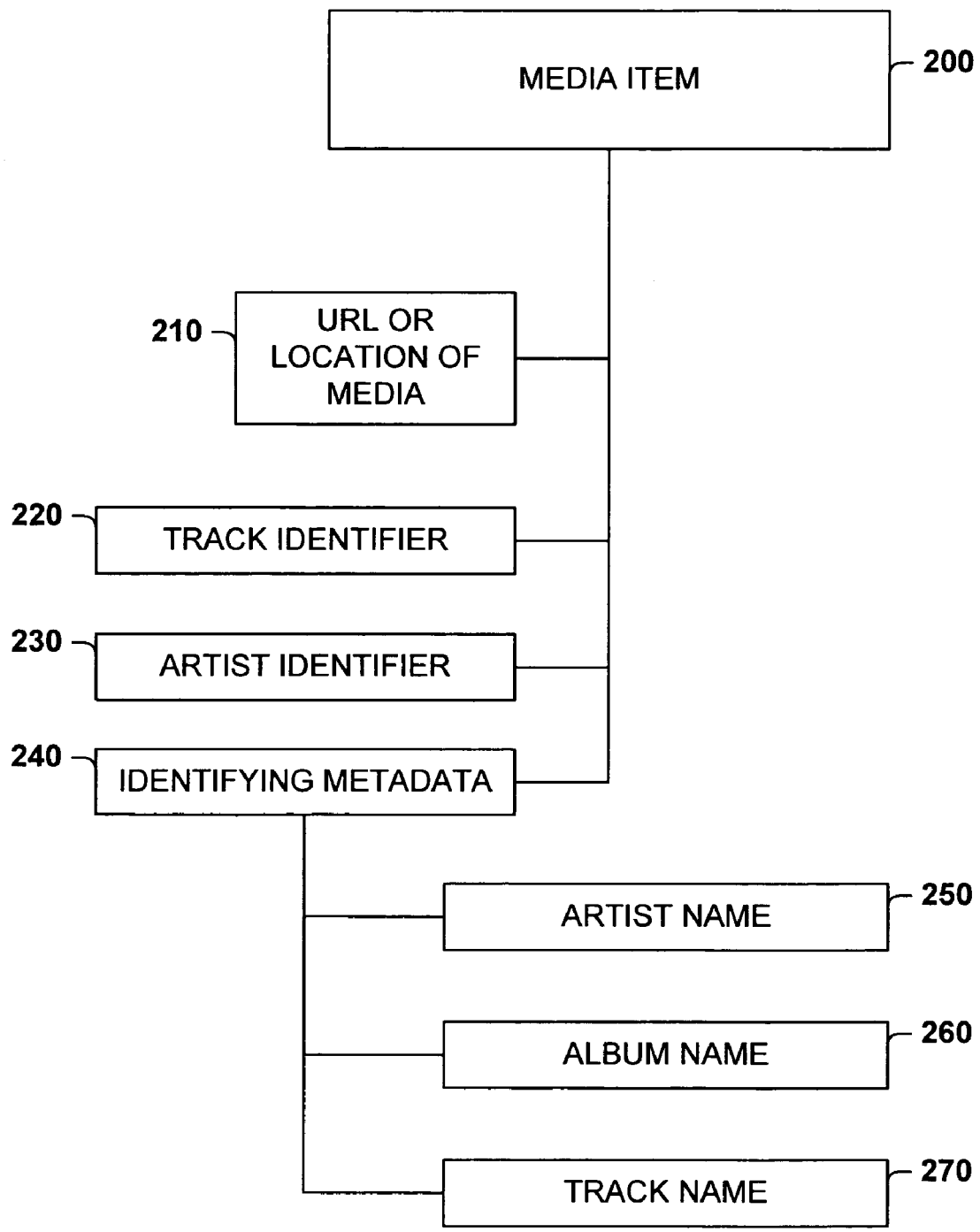
FIG. 2 illustrates exemplary information associated with a media item in accordance with the present invention.

Turning now to FIG. 2, an example of information associated with a media item 200 is illustrated. The exemplary information associated with the media item 200 includes a pointer 210 (e.g., universal resource locator, filename, . . . ) indicating the location of the to the media item 200 and permitting access to the media item. Alternately, the metadata can be included with media item 200 itself (e.g., by a 128 bit tag at the end of a file). Although the present invention is described primarily in relation to songs or audio, it is to be appreciated that the media items can include, but are not limited to, songs, movies, music videos, documents, books, poems, images (e.g., photographs), for example. The media item 200 is also associated with a unique track identifier 220 and a unique artist identifier 230. The media item 200 is also associated with identifying metadata 240. For a song, the identifying metadata 240 may include an artist name 250, an album name 260 and a track name 270. By way of illustration, the artist name 250 may be the name of a solo artist who performed a song or the name of a group that performed the song and an associated list of group members. By way of further illustration, the album name 260 may be the name of the album on which the song appeared and other information like the release date of the album. The track name 270 can include the name of the song, the length of the song, the amount of time between the first note of the song and the first lyric (if any) and the size (e.g., in kilobytes) of the song, for example. Such metadata (e.g., artist, album, track) can be employed to generate unique identifiers. Since the metadata can vary between metadata databases, inexact matching between items may be required. Furthermore, since the metadata may be incomplete, the present invention facilitates performing the inexact matching with such incomplete data. The purpose of the inexact matching employed in the item identification process is to read the identifying metadata from the media items and to create unique identifiers. The unique identifiers can refer, for example, to one or more rows in a reference metadata database. In the case of a song, the item identification process will attempt to assign a unique track identifier (e.g., 220) and a unique artist identifier (e.g., 230) to media items to facilitate, for example, accessing, storing and/or manipulating songs identified by the unique identifiers.

Figure 3:
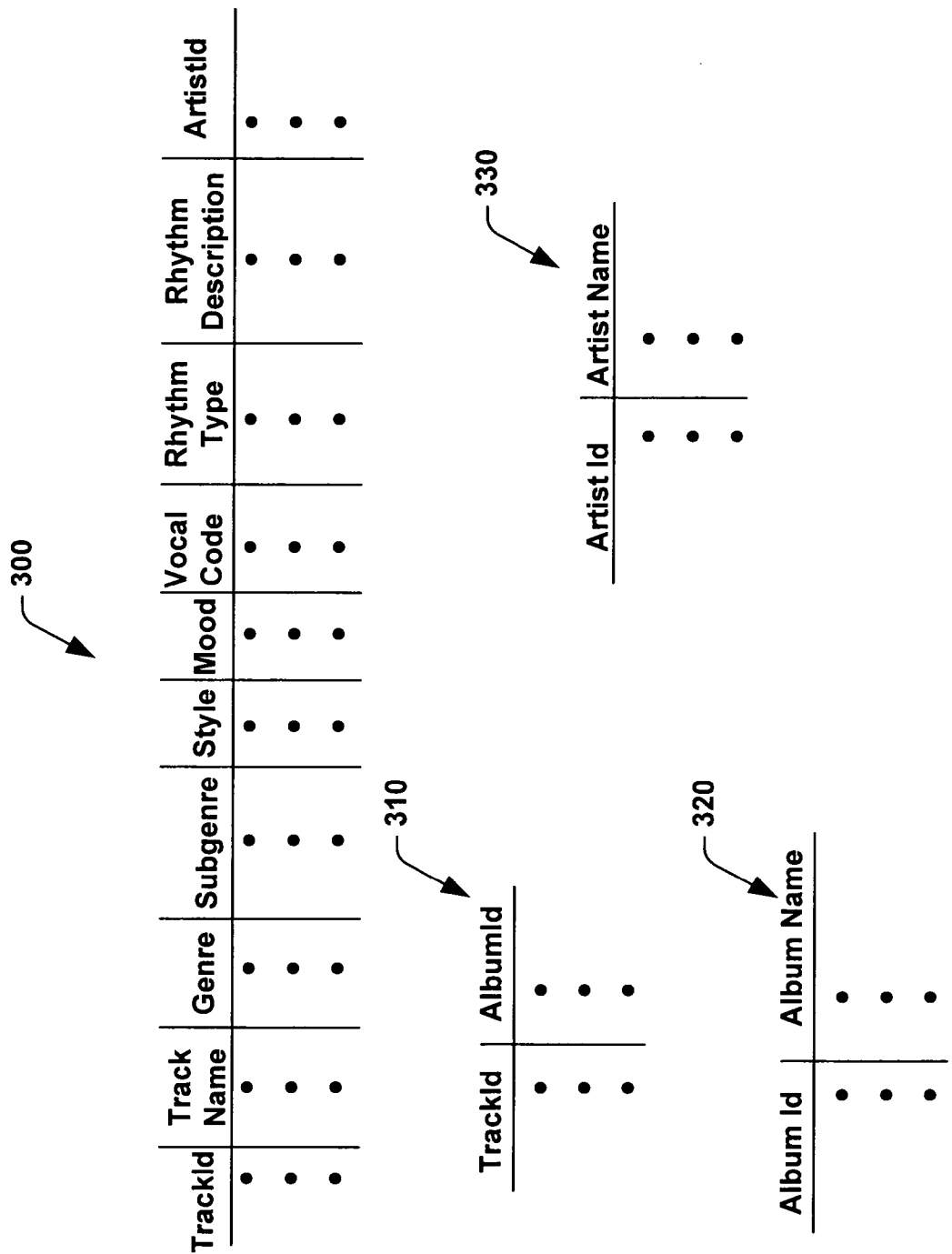
FIG. 3 illustrates exemplary metadata in accordance with the present invention.

FIG. 3 illustrates an exemplary reference metadata database schema in accordance with one particular aspect of the present invention. The sample reference metadata database includes four tables, although it is to be appreciated that other reference metadata databases may employ a greater or lesser number of tables. Table 300 illustrates per track metadata for songs. Thus, table 300 includes a unique track identifier field, a unique artist identifier associated with the unique track, a track name, a genre, a subgenre, a style, a mood, a vocal code, a rhythm type and a rhythm description. Table 310 stores many-to-many relationships between tracks and albums, where each row is an occurrence of a track on an album. Table 320 represents an album, where the album is associated with a unique album identifier and an album name. Table 330 represents an artist, where an artist is associated with a unique artist identifier and an artist name. To speed database access associated with the tables 300, 310, 320 and 330, indices on the unique identifiers and full-text indexing of names can be employed. Although the tables 300, 310, 320 and 330 are illustrated in the sample reference metadata database schema, it is to be appreciated that in a different embodiment of the present invention, the item identification system does not employ such tables and rather interacts directly with artist and track metadata or utilizes a different schema, as in the case of movies, documents, or books.

Figure 4:
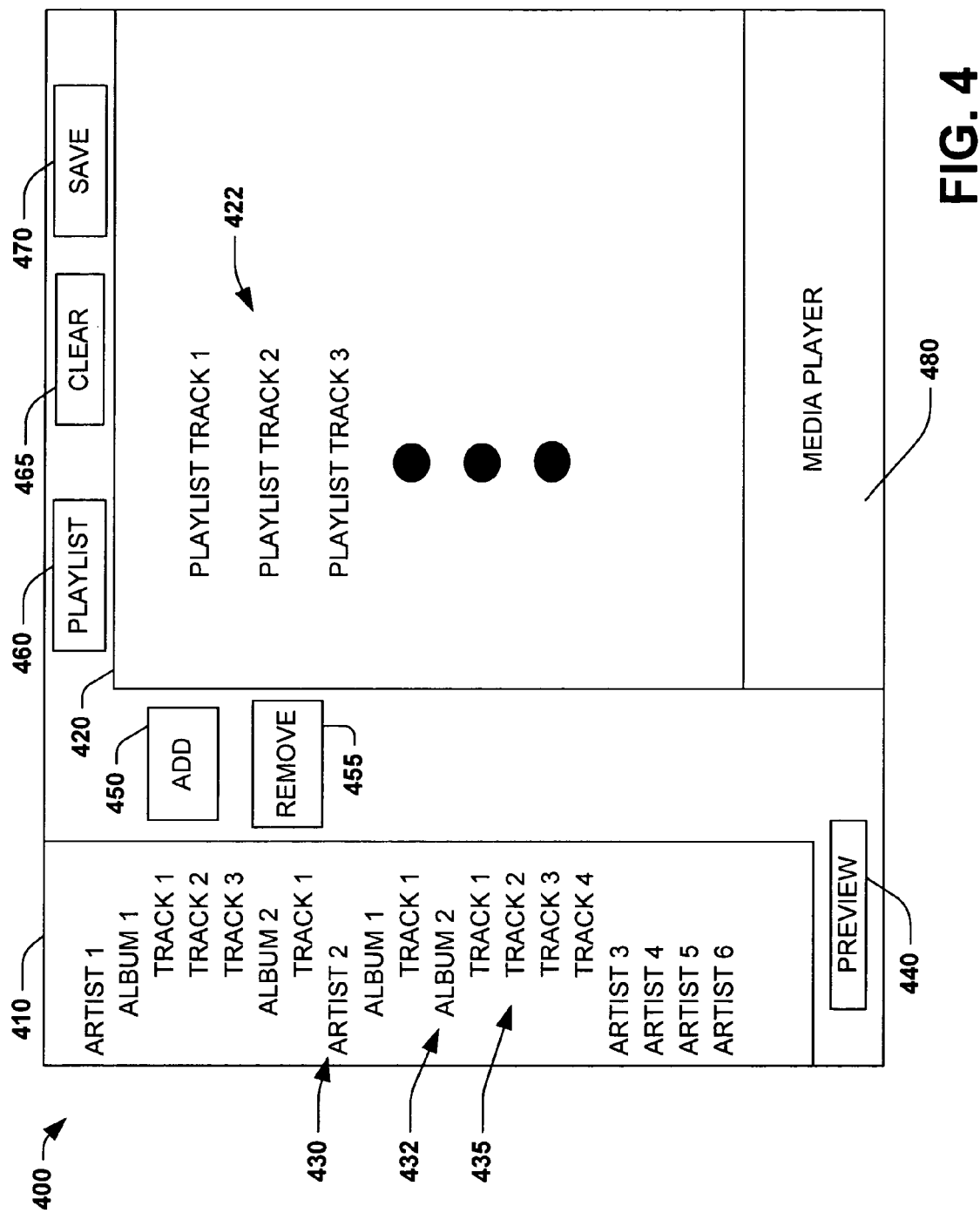
FIG. 4 is a block diagram of a user interface in accordance with the present invention.

Turning now to FIG. 4, a user interface 400 is depicted in accordance with an aspect of the present invention. The user interface 400 facilitates audio enjoyment of a library of media by automatically and dynamically generating playlists based on selected items. The user interface 400 includes two panes, a media library pane 410 and a playlist pane 420. The media library pane 410 illustrates information about a media collection or library (e.g., a particular user's media library). The media library pane 410 depicts information such as, but not limited to, artist name(s) 430, album name(s) 432 and track name(s) 435 and organizes the information hierarchically. The artists name(s) 430 are sorted alphabetically and open a list of album names for a particular artist when that artist's name is selected (e.g., clicked on). Similarly, the album name(s) 432 are alphabetically sorted and open a list of track names for a particular album when that particular album is selected. In alternate aspects, the album name(s) can be sorted in alternate methods such as, for example, by date. Likewise, the track name(s) 435 are also sorted alphabetically but can be sorted by other means such as, for example, their track number for a particular album. Other media types can be displayed hierarchically, also.

On selecting a track, a user can perform a number of actions on that selected track—the user can add it to the playlist by clicking on the add button 450. When the add button 450 is clicked, a playlist is then generated that fits or is similar to the selected song which is now referred to as a seed item and the selected song being added at the beginning of the playlist. The playlist is generated by estimating a user preference function based on characteristics of the selected track and identifying tracks in the media library that are likely to have high user preference. Various means for generating the playlist are described in detail elsewhere in this detailed description. The selected song can be distinguished from other items in the playlist by, for example, displaying the selected song in a different color and/or font. Additional tracks can be selected and added from the track name(s) 435 in the library pane 410 causing the playlist to be regenerated on so doing. The playlist can be regenerated by determining a new user preference function based on characteristics of all seed items and identifying tracks in the media library that are likely to have high user preference. Subsequently added tracks, also referred to as seed items, also can effect playlist regeneration. Another action that can be performed on the track name(s) 435 is a preview. By clicking on a preview button 440, a preview or short version of the selected track (e.g., playing 10 seconds of a song 30 seconds into the song) is played therein facilitating the user determining a preference or non-preference for the selected track name.

The playlist pane 420 displays the playlist that can be generated and regenerated. The playlist pane 420 permits viewing, manipulation and use of the automatically generated playlist. The playlist pane 420 contains a list of tracks 422 in the playlist. Once a track of the playlist is selected, several actions can be selectively performed on the playlist and the selected track. For example, once a track of the playlist is selected, the add button 450 is disabled and a remove button 455 is enabled. Then, the remove button 455 can be clicked causing the playlist to be regenerated whilst avoiding tracks similar to the track removed. The track removed is also a seed item but is utilized to identify undesirable characteristics. Additional tracks can be removed and other tracks added, therein causing the playlist to be regenerated, until the playlist is acceptable (e.g., a user is happy with it). The preference function is adaptively modified as a function of the removed tracks and the added tracks and employed to identify tracks in the media library that are similar to the desired characteristics (e.g., tracks added) and dissimilar to the undesirable characteristics (e.g., tracks removed).

Figure 5:
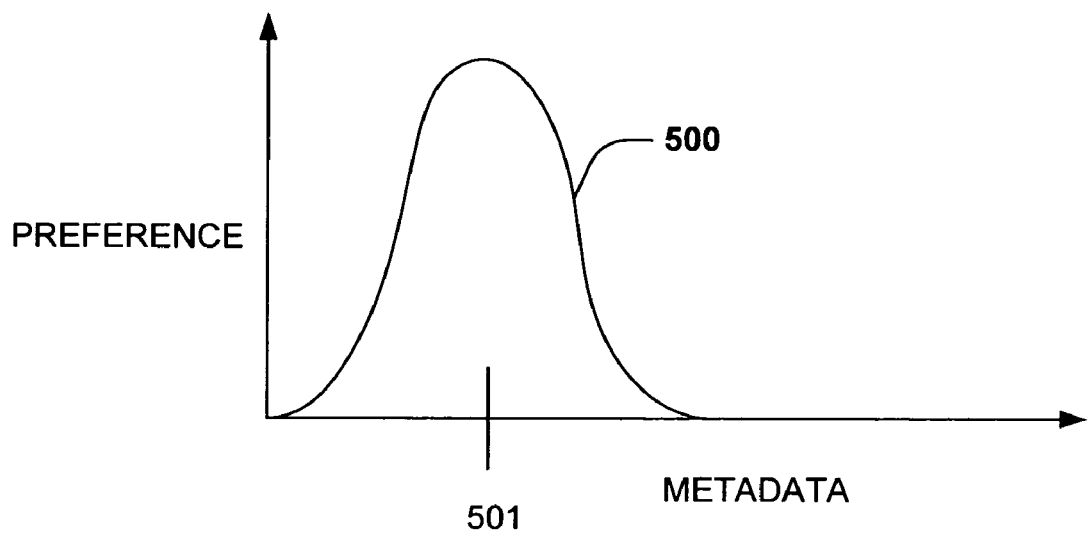
FIG. 5 illustrates a preference function obtained for a seed item in accordance with the present invention.
Figure 6:
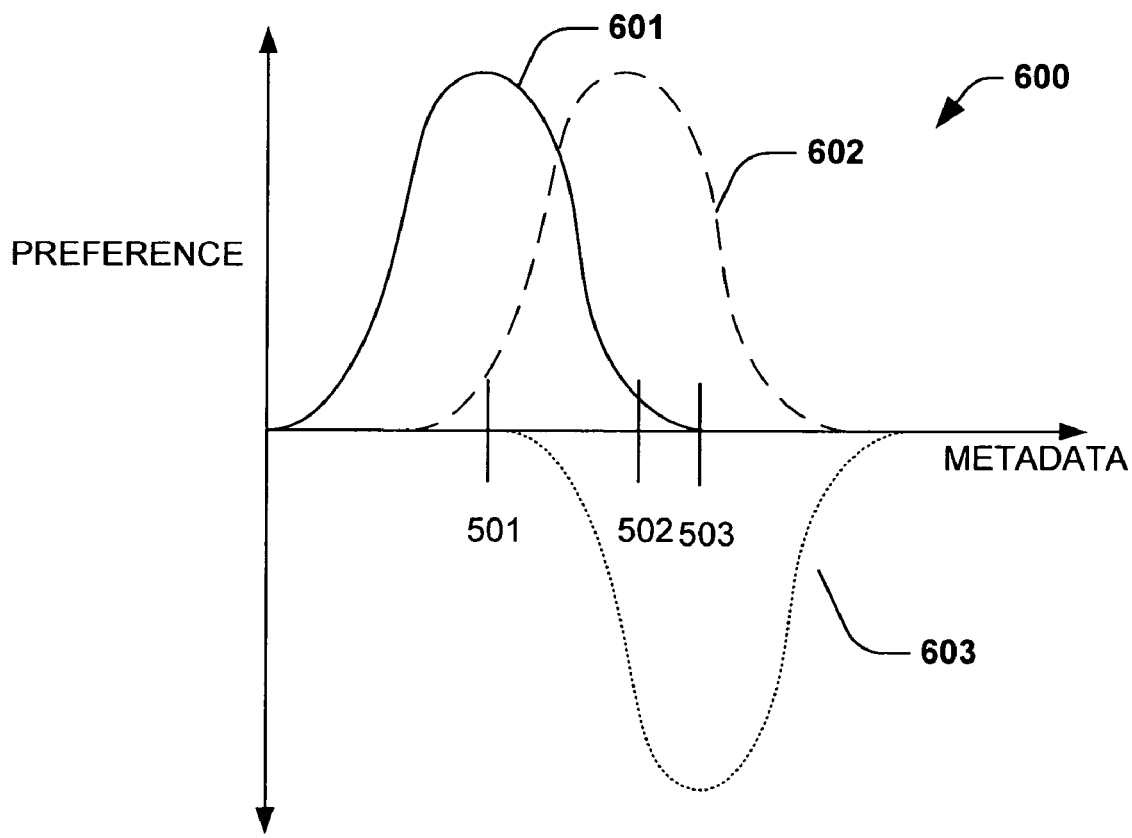
FIG. 6 illustrates a preference function obtained for seed items in accordance with the present invention.
Figure 7:
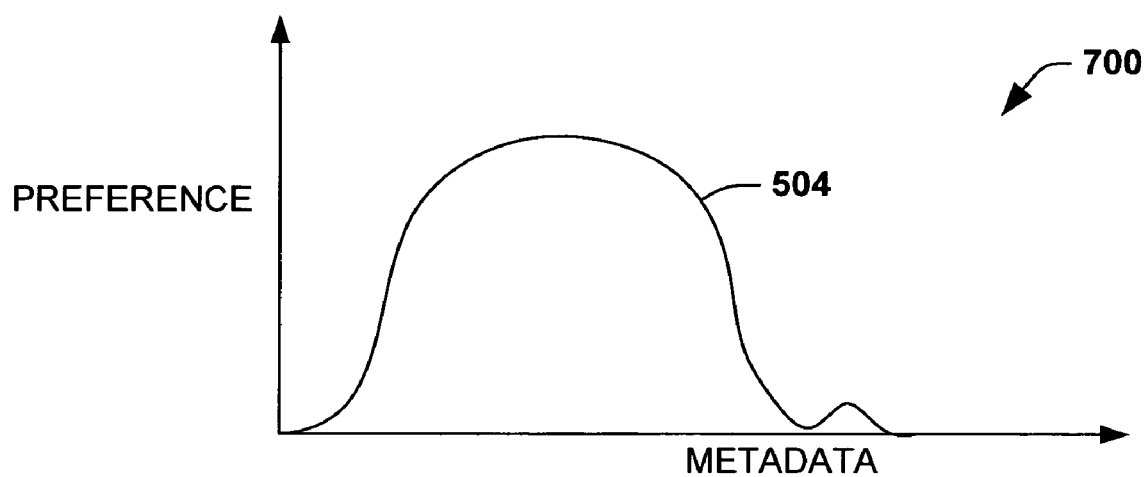
FIG. 7 illustrates a composite preference function obtained for seed items in accordance with the present invention.

FIGS. 5, 6 and 7 illustrate graphical representation of exemplary preference functions. It is appreciated that the present invention is not limited to the preference functions illustrated in FIGS. 5–7. FIG. 5 depicts a preference function 500 obtained for a first desirable seed item 501. FIG. 6 depicts individual preference functions 601, 602, and 603 obtained for the first desirable seed item 501 along with a second desirable seed item 502 and an undesirable seed item 503. FIG. 7 illustrates a composite preference function 700 for a composite 504 of the first desirable seed item 501, the second desirable seed item 502 and the undesirable seed item 503. Such a composite preference function can be a linear blend of the three preference functions 601, 602, and 603. The preference function 700 can be employed, as discussed herein, to identify similar tracks.

Returning to FIG. 4, a play button 460 can be activated (e.g., by clicking) to cause the current playlist to be played or, alternately, a specific item in the playlist to be played. Generally, double clicking on a track of the playlist effects playing of the track. A clear button 465 can be employed to reset or clear (e.g., by removing the items from the playlist) the current playlist in the playlist pane 420 and to clear internal states of the playlist generation algorithm utilized. A save list button 470 can be activated to cause the current playlist to be saved in a standard format. This can be helpful in permitting a user to try various seed items (e.g., via removing or adding tracks) without losing a previously generated playlist. Consequently, an open button (not shown) can be utilized to load in previously stored playlists.

An instance of a media player 480 is also a component of the interface 400. The media player 480 is utilized to play the media identified in the playlist. The media player 480 is controllable to adjust volume, equalizer settings, fast forward (e.g., search), rewind, skip forward (e.g., to next item in playlist), skip backward (e.g., to previous item in playlist), balance and the like. Additionally, the media player 480 can display item information such as, title, file name, artist, album, genre and the like and can display playlist information such as, author (e.g., John), title (e.g., John's party mix), date generated.

Figure 8:
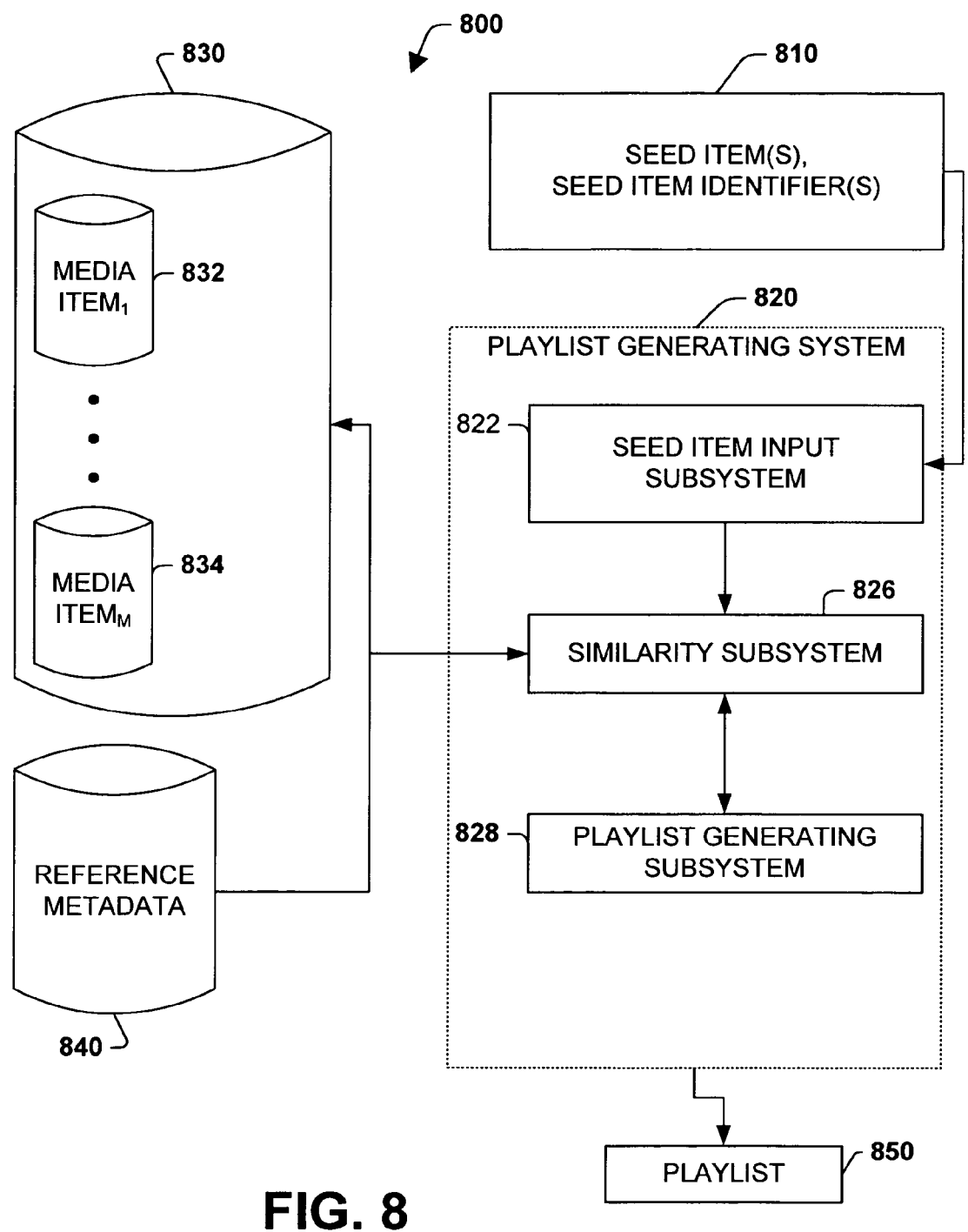
FIG. 8 is a block diagram of a system that facilitates playlist generation in accordance with the present invention.

FIG. 8 illustrates a system 800 that facilitates generating playlists by inputting seed item(s) and/or seed item identifier(s) (e.g., unique identifiers), the seed item(s) including positive seed item(s) (e.g., desired) and negative seed item (s) (e.g., undesired) and determining a degree of similarity and/or dissimilarity between the seed item(s) and one or more candidate media items. We assume that if two items are similar, then the user preference for those items will also be similar. Thus, all preference computations are similarity computations. The system 800 includes a user data store 830 that contains one or more media items (e.g., MEDIA ITEM$_1$ 832 through MEDIA ITEM$_M$ 834, M being an integer), also referred to as a collection or library. The media items can include items like songs, audio books, movies, music videos, documents, electronic books and the like. The system 800 includes a playlist generating system 820 that can have one or more subsystems (e.g., seed item input subsystem 822, similarity subsystem 826, playlist generating subsystem 828) that are employed to produce a playlist 850. The playlist 850 can include one or more media items and/or data sufficient to identify and/or retrieve one or more media items, where the media items are placed in the playlist 850 based on a similarity criterion between the media items and the seed item(s). By way of illustration, if a user desires to view a group of music videos that are from the same genre with a similar rhythm (e.g., punk, frenetic), then appropriate similarity criteria can be employed to produce a playlist 850 of such similar songs. By way of further illustration, if a user wishes to view a mixed group of music videos (e.g., pop, rock, country), other appropriate similarity criteria can be employed to produce the playlist 850 of such mixed songs.

The playlist generating system 820 can accept as input seed item(s) and/or seed item identifier(s) 810. By way of illustration and not limitation, a user can interact with the playlist generating system 820 by providing a song to the playlist generating system 820 and directing the playlist generating system 820 to select similar songs. By way of further illustration and not limitation, a user can alternatively, and/or additionally interact with the playlist generating system 820 by providing a unique seed song identifier. The seed item(s) 810 can be accepted by the seed item input subsystem 822 which can perform pre-processing on the seed item information 810 (e.g., validation, formatting) before passing it to the similarity subsystem 826, which can compare descriptive metadata associated with the seed item (s) 810 to descriptive metadata associated with the candidate media item to determine a degree of similarity that can be employed by the playlist generating subsystem 828 to determine whether the candidate media item should be included in the playlist 850. In one example of the present invention, the user data store 830 and the playlist generating system 820 reside on a client system. The similarity system 826 may access the user data store 830 and a reference metadata data store 840 to make the determination of similarity.

Figure 9:
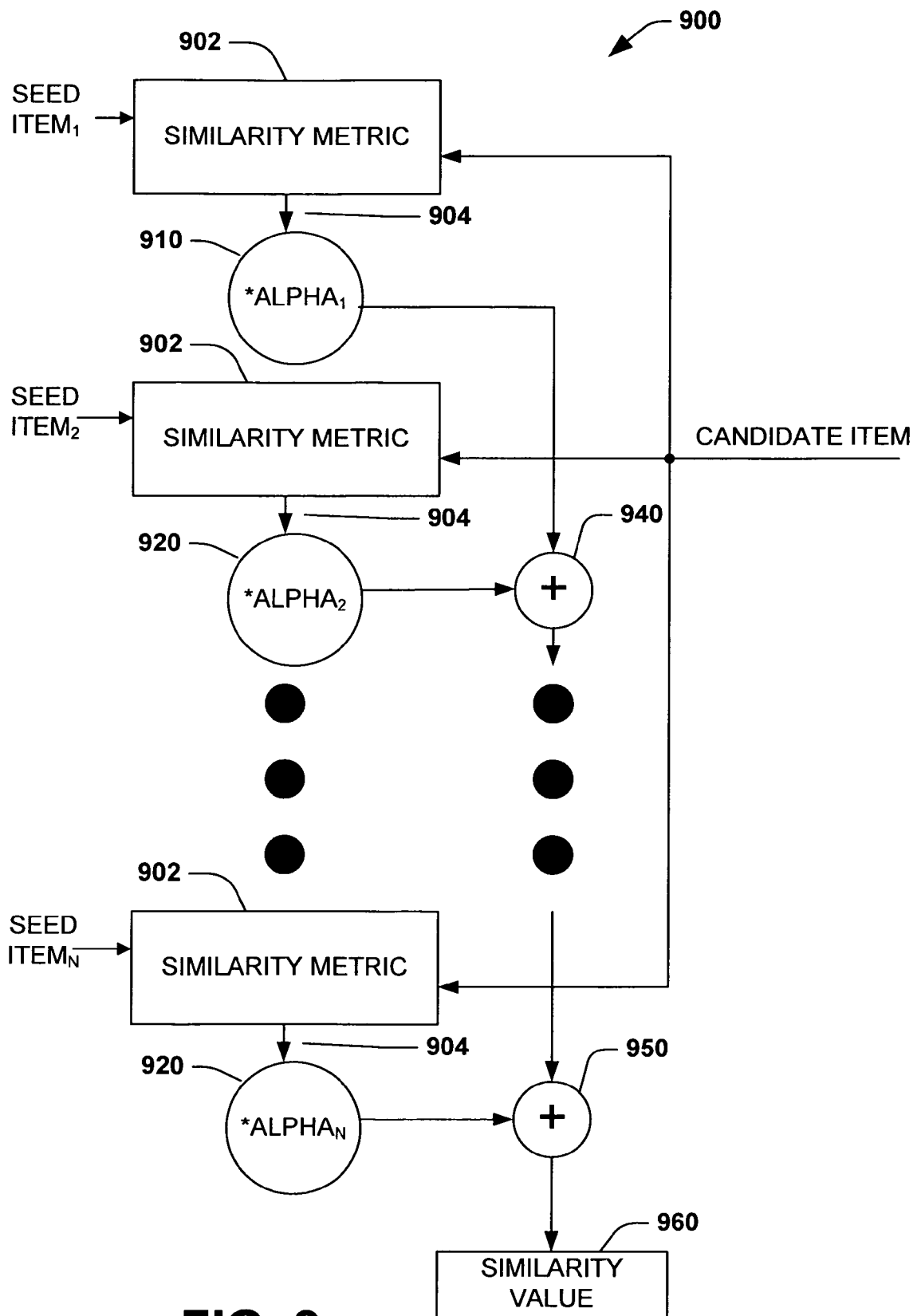
FIG. 9 is a block diagram of a similarity subsystem that facilitates playlist generation in accordance with the present invention.
Figure 10:
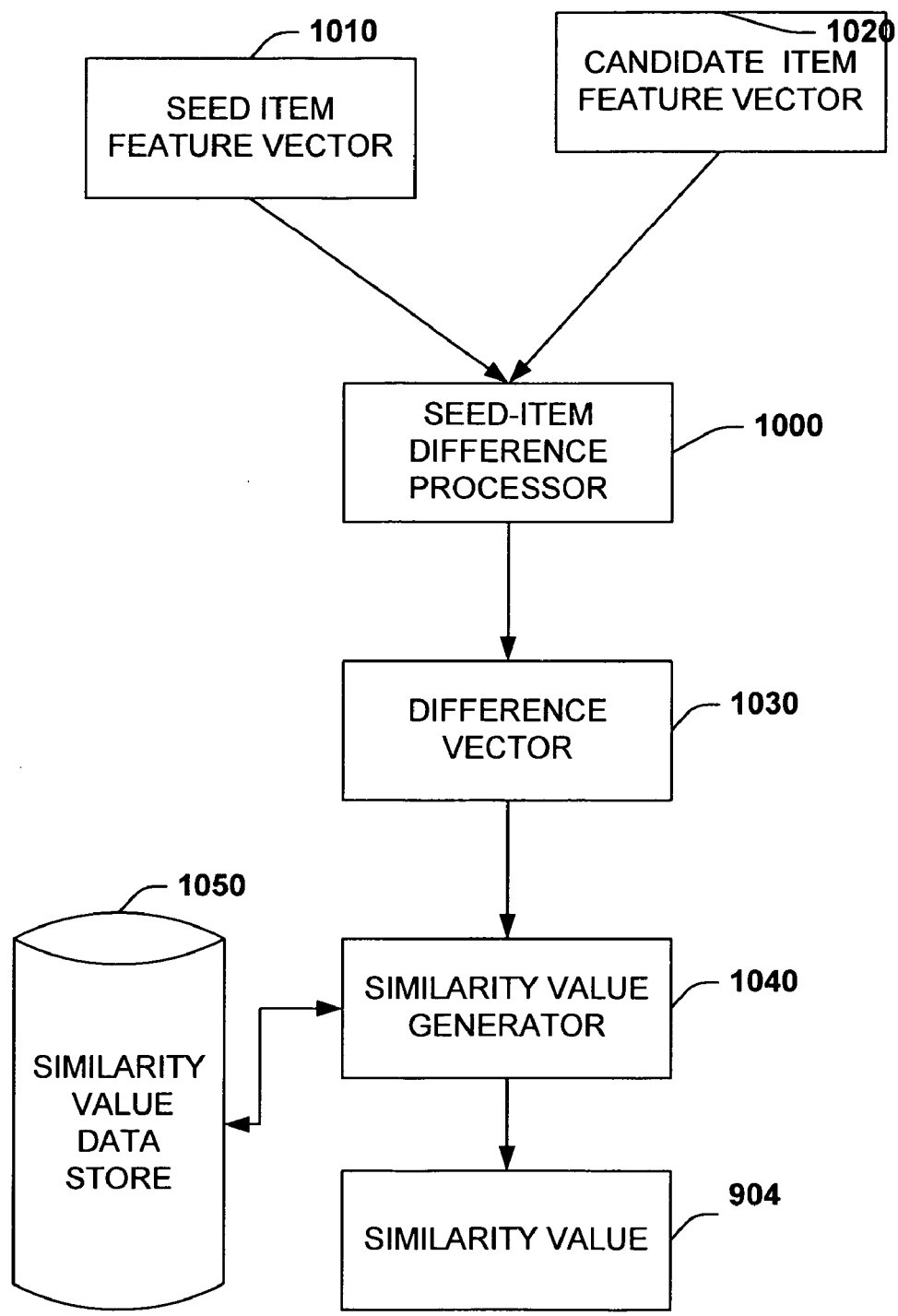
FIG. 10 is a block diagram of a system that generates a final similarity value in accordance with the present invention.

Turning now to FIG. 9, a similarity subsystem 900 is depicted that computes a similarity value 960 in accordance with an aspect of the present invention. N seed items are compared to a candidate item from a collection or library by comparing each seed item individually to the candidate item by similarity metric(s) 902 to obtain a similarity value(s) 904. The similarity value 904 is a value that indicates similarities between the candidate item and a respective seed item. A suitable scheme, such as is described in further detail with respect to FIG. 10, is utilized to obtain the similarity metric(s) 902. The similarity value(s) 904 computed for each seed item is then multiplied by N weights 920; alpha$_1$, alpha$_2$, . . . alpha$_N$ and then summed together to produce a final similarity value 960 which can then be employed with system 100 of FIG. 1, system 500 of FIG. 5 and/or other suitable systems for generating playlists in accordance with the present invention. Generally, if the similarity value 960 exceeds a threshold amount, the candidate item is added to a playlist and if it does not, it is not added to the playlist. Subsequently, a next candidate item, if present, is then processed by the subsystem 900.

The weights 920 can be generated via a variety of suitable approaches. One suitable approach is to simply assign the respective weights 920 as +1. This approach results in the similarity value 960 that is an average of the respective similarity value(s) 904. Another approach is to assign the respective weights 920 as +1 for indicating that a seed item is desirable (e.g., by adding a track in FIG. 1) and as −1 for indicating that a seed item is undesirable (e.g., by removing a track in FIG. 1). This approach produces the similarity value 960 that is a function of desirable and undesirable seed items. Yet another approach is to assign the respective weights 920 by selected values from a range (e.g., +1 to −1). The respective weights 920 can be selected or input by a user (e.g., by a user selecting a weight for an added or removed item). Thus, larger weights (in absolute value terms) have more of an effect on the final similarity value 960 than smaller weights.

However, it is possible that one or more of the seed item(s) are also candidate items. Thus, the weights are computed such that if the candidate item is the same as one of the desirable seed items (e.g., added), the resulting similarity is exactly 1 while if the candidate item is the same as one of the undesirable seed items (e.g., removed), the resulting similarity is exactly 0. Alternatively, if the user has expressed a non-binary target preference (between 0 and 1), then the resulting similarity should match the target preference. This computation can be represented as a linear system. Let the vector $b_i$=1 if the ith seed item has been added, 0 if it has been removed (or, more generally, $b_i$=the target preference value for the ith seed item). Then, let $K_{ij}$ be the matrix of similarities produced when the similarity metric 902 is applied to the ith and the jth seed items. Then, assuming that the matrix $K_{ij}$ is invertible, the $\alpha_j$ (weight corresponding to the jth seed item) can be solved by solving the linear system:

$$\sum_j K_{ij}\alpha_j = b_i \qquad (1)$$

Given the seed item(s), Eq. 1 is only required to be solved once to obtain $\alpha_j$ since it is a linear system. If the matrix $K_{ij}$ is not invertible, other methods can be employed to obtain a solution. One method is to add a small offset to the diagonal of $K_{ij}$ to make it invertible:

$$\sum_j (K_{ij} + \sigma\delta_{ij})\alpha_j = b_i \qquad (2)$$

Additionally, other methods, such as singular value decompositions can be utilized to obtain the solution.

Turning now to FIG. 10, a block diagram of a similarity metric 902 from FIG. 9 employed in computing a similarity value 904 is depicted. A seed-item difference processor 1000 accepts as inputs a seed item feature vector 1010 and a candidate item feature vector 1020. While FIG. 10 refers primarily to feature vectors and feature vector similarity processing, it is to be appreciated that other similarity analysis techniques may be employed in accordance with the present invention. In one example of the present invention, the seed item feature vector 1010 includes fields encoding information relating to genre, subgenre, genre, style, mood, vocal coding, rhythm type and rhythm description. Similarly, the candidate item feature vector 1020 also includes fields encoding information relating to genre, subgenre, genre, style, mood, vocal coding, rhythm type and rhythm description. Thus, the seed-item difference processor 1000 can compare the feature vectors using suitable techniques (e.g., attribute wise comparison) to produce a difference vector 1030. For example, if the seed item feature vector 1010 and the candidate item feature vector 1020 both code information relating to seven attributes, the difference vector 1030 would indicate differences and/or similarities among the seven attributes (e.g., a seven bit or seven attribute vector). The difference vector 1030 is then employed as an input to a similarity value generator 1040 that can employ the difference vector 1030 as an index into a similarity value data store 1050 to produce the similarity value 1060. The similarity value data store 1050 can store, for example, a lookup table that can be employed to translate the difference vector 1030 into the similarity value 1060. In one example of the present invention, the similarity value data store 1050 contains correlation values that were generated by machine learning techniques applied to similarity processing involving difference vectors generated from seed item feature vectors and candidate item feature vectors. One example of a number of similarity values and corresponding difference vectors are depicted below in Table I. The order of the features in the difference vector in Table I is, from left to right, mood, rhythm description, rhythm type, vocal coding, style, subgenre, and genre.

TABLE I

| | | | | | | | |
|---|---|---|---|---|---|---|---|
| 1.00000 | 1111111 | 0.65718 | 1101111 | 0.48806 | 1011111 | 0.46408 | 0111111 |
| 0.42899 | 1001111 | 0.38207 | 0101111 | 0.28465 | 1110111 | 0.27998 | 0011111 |
| 0.27839 | 0001111 | 0.22812 | 1100111 | 0.18447 | 1010111 | 0.18411 | 1000111 |
| 0.17514 | 0110111 | 0.14698 | 0100111 | 0.11046 | 0010111 | 0.11046 | 0000111 |
| 0.08364 | 1111011 | 0.07779 | 1101011 | 0.06834 | 0111011 | 0.06624 | 1011011 |
| 0.06434 | 0101011 | 0.06323 | 1001011 | 0.05369 | 0011011 | 0.05210 | 0001011 |
| 0.04052 | 1110011 | 0.03795 | 1100011 | 0.03272 | 0110011 | 0.03120 | 1010011 |
| 0.03084 | 1000011 | 0.03072 | 0100011 | 0.02814 | 1111001 | 0.02407 | 0010011 |
| 0.02407 | 0000011 | 0.02229 | 1101001 | 0.01826 | 0111001 | 0.01676 | 1011001 |

TABLE I-continued

| | | | | | | | |
|---|---|---|---|---|---|---|---|
| 0.01425 | 0101001 | 0.01375 | 1001001 | 0.00962 | 0011001 | 0.00874 | 1110001 |
| 0.00803 | 0001001 | 0.00634 | 0110001 | 0.00616 | 1100001 | 0.00508 | 1010001 |
| 0.00472 | 1000001 | 0.00435 | 0100001 | 0.00419 | 1111000 | 0.00337 | 0010001 |
| 0.00337 | 0000001 | 0.00233 | 1011000 | 0.00216 | 1101000 | 0.00215 | 0111000 |
| 0.00140 | 1001000 | 0.00125 | 0101000 | 0.00124 | 1110000 | 0.00086 | 0011000 |
| 0.00065 | 0001000 | 0.00058 | 0110000 | 0.00057 | 1010000 | 0.00053 | 1100000 |
| 0.00036 | 1000000 | 0.00031 | 0100000 | 0.00029 | 0010000 | 0.00029 | 0000000 |

In Table I, the similarity values fall within the range 0 to 1.0. Examining a first entry, 1.00000 1111111, the difference vector 1111111 indicates that the seed item feature vector 1010 matched the candidate item feature vector 1020 in each attribute, thus, each bit of the difference vector was set to one, and the corresponding similarity value 1.00000 indicates a high degree of similarity between the two items. Examining a second entry, 0.06834 0111011, the difference vector 0111011 indicates that the seed item feature vector 1010 matched the candidate item feature vector 1020 in five attributes (rhythm description, rhythm type, vocal code, subgenre, and genre), and that the corresponding similarity value is 0.06834. Similarly, a third entry 0.04052 1110011 also indicates that the seed item feature vector 1010 matched the candidate item feature vector 1020 in five attributes (mood, rhythm description, rhythm type, subgenre and genre), and that the corresponding similarity value is 0.04052. Thus, the machine learning that was applied to the feature vectors and/or difference vectors determined that the combination of five matched attributes coded in the difference vector 0111011 should result in a higher similarity value than the five matched attributes coded in the difference vector 1110011. While one table of difference vectors and similarity values are described in connection with FIG. 10, it is to be appreciated that other such tables may be employed in accordance with the present invention, where such tables are hand coded, machine coded and/or the result of machine learning algorithms. It is to be further appreciated that although difference vectors and feature vectors with seven attributes are discussed in connection with FIG. 10, that difference vectors and/or feature vectors with a greater or lesser number of attributes, and/or with different attributes can be employed in accordance with aspects of the present invention.

Tables such as table I can be generated using the following machine learning algorithm. Let $K_{ij}$ be defined by a training set of albums (or playlists) such that $$K_{ij} = \sum_n f_n(s_i) f_n(s_j) \quad (3)$$

where $f_n(s_i)$ is defined to be 1 when song $s_i$ appears on the nth album (or playlist), 0 otherwise. It is to be appreciated that the matrix $K_{ij}$ is sparse, and hence can be stored and manipulated as a sparse matrix. The weights in the lookup table can be computed by first solving the sparse quadratic program $$\underset{\alpha}{\operatorname{argmin}} \left( K_{ij} - \sum_k \alpha_k \psi_k(s_i, s_j) \right)^2 \quad (4)$$

subject to the constraints that all $\alpha_k$ are non-negative. The $\alpha_k$ become a second layer of trainable weights, and the $\psi_k$ are the first-layer of fixed basis functions, defined to be 1 if $A_{kl}$ is 0 or $x_{il}$ has the same value as $x_{jl}$ for all l, where $A_{kl}$ is further defined to be the lth bit of the binary representation of the number k, and where $x_{il}$ is the lth metadata feature of the song $s_i$. In the case of the metadata feature vectors described above, l will range from 1 to 7 and k will range from 0 to 127, although other metadata feature vectors and other ranges are possible. Solving sparse quadratic programs is known in the art. The two-layer system can be represented in a lookup table, such as that shown in Table 1, by computing $L_m$ (the mth lookup table entry) via $$L_m = \sum_k \alpha_k g_{km} \quad (5)$$

where $g_{km}$ is defined to be 1 if $A_{kl}$ is zero or $A_{ml}$ is 1 for all l, and 0 otherwise. It is to be appreciated that other machine learning algorithms can be used to generate such lookup tables, or the lookup table can be hand-designed.

In view of the exemplary systems shown and described above, methodologies that may be implemented in accordance with the present invention, will be better appreciated with reference to the flow charts of FIGS. 11–14. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 11:
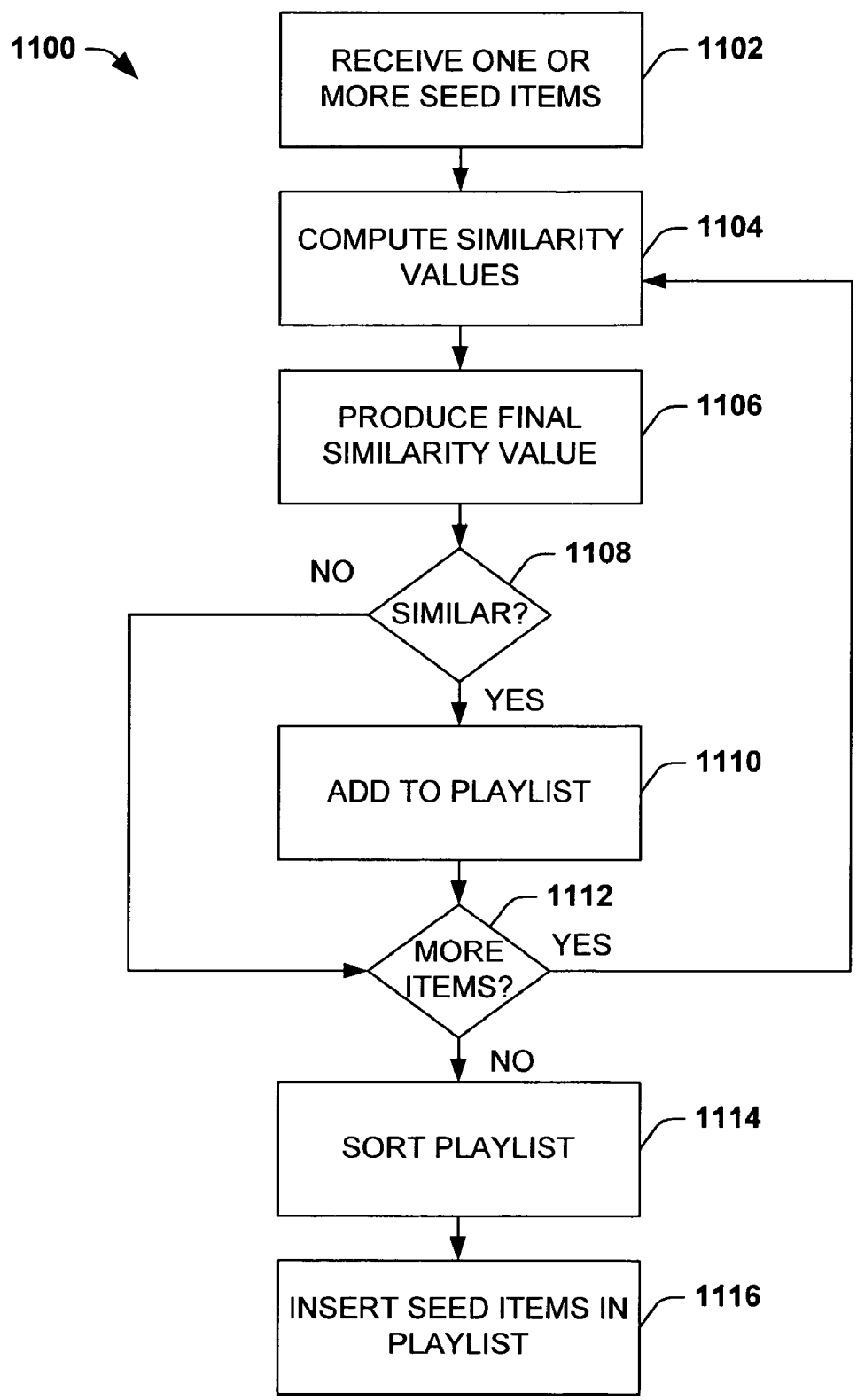
FIG. 11 is a flow diagram of a method for generating a playlist in accordance with the present invention.

Turning now to FIG. 11, a flow diagram of a method 1100 of generating a playlist in accordance with an aspect of the present invention is depicted. The method 1100 receives one or more seed items and generates a playlist there from for a library or collection of media items. The media items are types of digital media such as, but not limited to, songs or music, videos, electronic books, documents, images and the like. The seed items are typically members of the library or collection of media items. The method 1100 can be invoked for a set number of seed items and/or can be (re)invoked on one or more new seed items being received.

Beginning at 1102, the method 1100 receives one or more seed items. The one or more seed items are members the library or collection of media items. The one or more seed items can be obtained by means and methods described above, but omitted here for brevity. Similarity values are then computed for the respective seed items by comparing the seed items, individually, to a candidate item at 1104. Generally, a similarity value for each seed item is computed for the respective media items, also referred to as candidate items. The similarity values are weighted and added together to produce a final similarity value at 1106. The weights for the individual similarity values can be obtained via a variety of suitable approaches. One approach is to assign the respective weights for the similarity values as +1. This approach results in the similarity value that is an average of the respective similarity values. Another approach is to assign the respective weights as +1 for indicating that a seed item is desirable (e.g., by adding a track in FIG. 1) and as −1 for indicating that a seed item is undesirable (e.g., by removing a track in FIG. 1). This approach produces the final similarity value that is a function of desirable and undesirable seed items. Yet another approach is to assign the respective weights by selected values from a range (e.g., +1 to −1). The respected weights can be selected or input by a user (e.g., by a user selecting a weight for an added or removed item). Thus, larger weights (in absolute value terms) have more of an effect on the final similarity value than smaller weights.

However, it is possible that one or more of the seed item(s) are also candidate items. Thus, the weights are computed such that if the candidate item is the same as one of the desirable seed items (e.g., added), the resulting similarity is exactly 1 while if the candidate item is the same as one of the undesirable seed items (e.g., removed), the resulting similarity is exactly 0. Alternatively, if the user has expressed a non-binary target preference (between 0 and 1), then the resulting similarity should match the target preference. This computation can be represented as a linear system and is discussed with respect to FIG. 8 and thus, omitted here.

The method 1100 continues at 1108, where media items of the collection are added to a playlist (e.g., their path and/or filename) at 1110 if their final similarity value with respect to the one or more seed items exceeds a minimum threshold. For example, for an implementation having 7 attributes (e.g., from meta data), a media item could be required to have a final similarity value equal or greater than 0.714 which indicates that the media item has about 5 of 7 attributes in common with the one or more seed items. It is appreciated that factors such as weights and undesirable characteristics can modify the number of attributes a media item has in common with the respective seed items while still providing a suitable final similarity value. If there are additional items in the collection at 1112, the method 1100 continues with a next item at 1104. Otherwise, if there are no more items in the collection at 1112, the method 1100 continues at 1114 where the items or tracks in the playlist are sorted according to their respective final similarity values. Thus, items that are more similar are played or encountered prior to less similar items. This is generally desirable because, for example, a user would likely prefer to hear the more similar songs first. Additionally, the desirable seed items, by virtue of necessarily being more similar, are inserted at the beginning of the playlist at 1116.

The playlist can then be utilized by a device or component to, for example, play audio songs (e.g., for digital music), play a slide shows (e.g., for images), music videos and the like according to the playlists. Additionally, as discussed above, the generated playlist can be modified by adding or removing seed items and then employing the method to regenerate the playlist including the new items.

Figure 12:
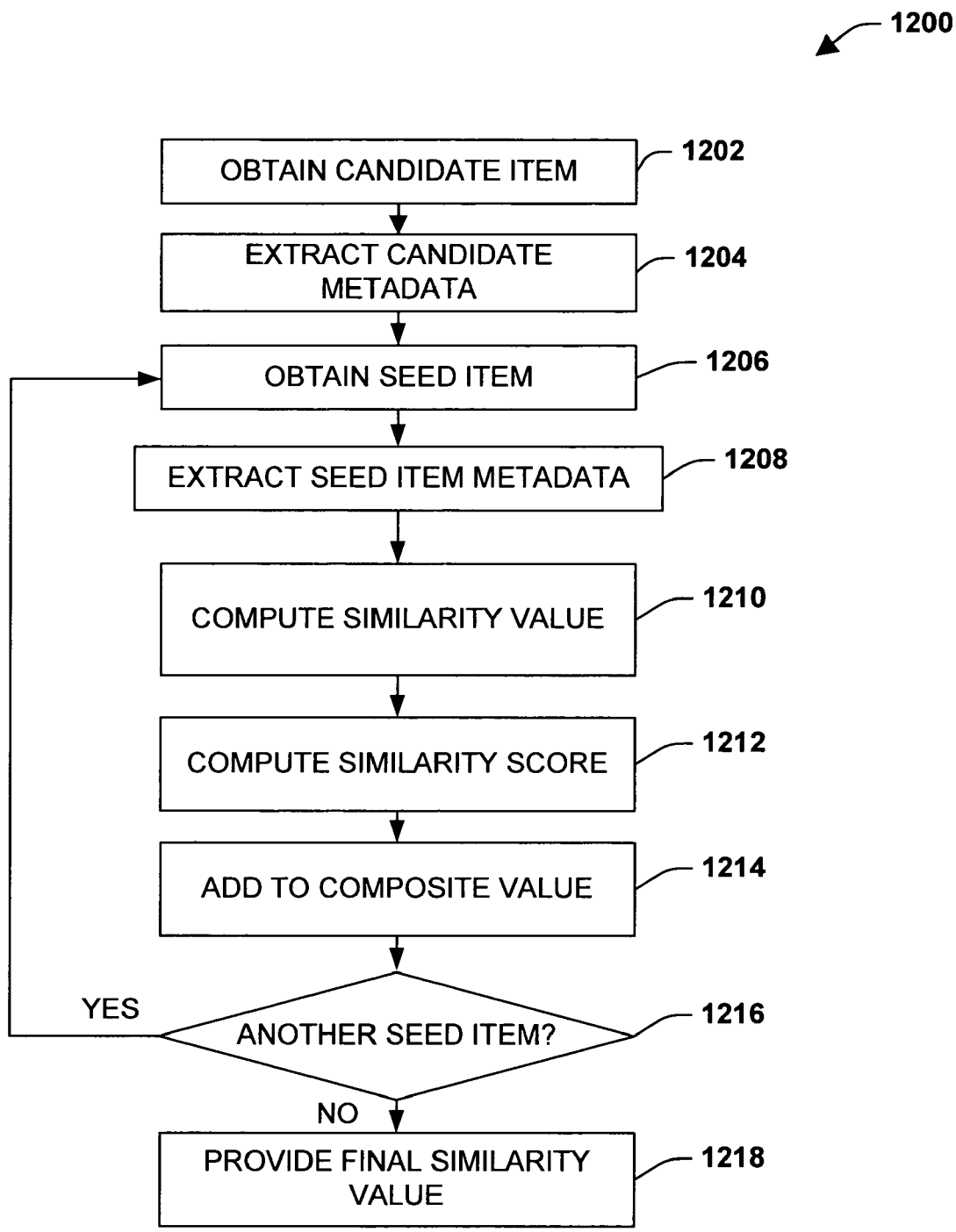
FIG. 12 is a flow diagram of a method for computing a similarity value in accordance with the present invention.

Referring now to FIG. 12, a method 1200 of computing a final similarity value for one or more seed items and a candidate item in accordance with an aspect of the present invention is disclosed. For illustrative purposes only, the method 1200 is discussed with respect to a candidate item, but it is appreciated that the method 1200 can be employed with any suitable number of candidate items that might comprise a library or collection of media items.

A candidate item is obtained at 1202, the candidate item being a member of a library or collection of media items. Candidate item metadata is obtained from the candidate item at 1204. The media items can include types of media such as, but not limited to, music, video, images and the like. A seed item is obtained at 1206 that represents desired or undesired characteristics. Seed item metadata is then obtained or extracted from the seed item at 1208. The metadata can be obtained by the metadata being part of the seed item and/or candidate item (e.g., a tag in a file), being stored in a metadata database or can be obtained from analyzing the items themselves.

A similarity value or metric is computed according to the seed item metadata and the candidate item metadata at 1210. A variety of suitable methods of computing the similarity value are described elsewhere in this description, but omitted here for brevity. Subsequently, the similarity value is multiplied by a weighting factor at 1212. The weighting factor indicates degrees of desirability and undesirability of the seed item. For example, a weight of +1 typically is employed to indicate a strong preference for that seed item while a weight of −1 generally is utilized to indicate a strong dislike for the seed item by a user. Additionally, the weighting factor can be obtained with the seed item by means, for example, described with respect to FIG. 4. After the similarity value has been computed at 1212, the similarity value is added to a composite similarity value at 1214. The composite value is essentially a running total or summation of the similarity values for one or more seed items and the single candidate items.

If another seed item is available to be processed at 1216, the method 1200 continues at 1206 with the next seed item. Otherwise, if there are no more seed items to process at 1216, the composite similarity value is utilized as the final similarity value at 1218. Additional processing can be performed on the final similarity value, such as by dividing it by the number of seed items or some other scaling to produce a unified result. Then, that final similarity value is typically employed to determine whether or not to add the candidate item to a playlist and to order or sort the playlist. Finally, the method 1200 can be invoked to process remaining items of library or collection, if present.

Figure 13:
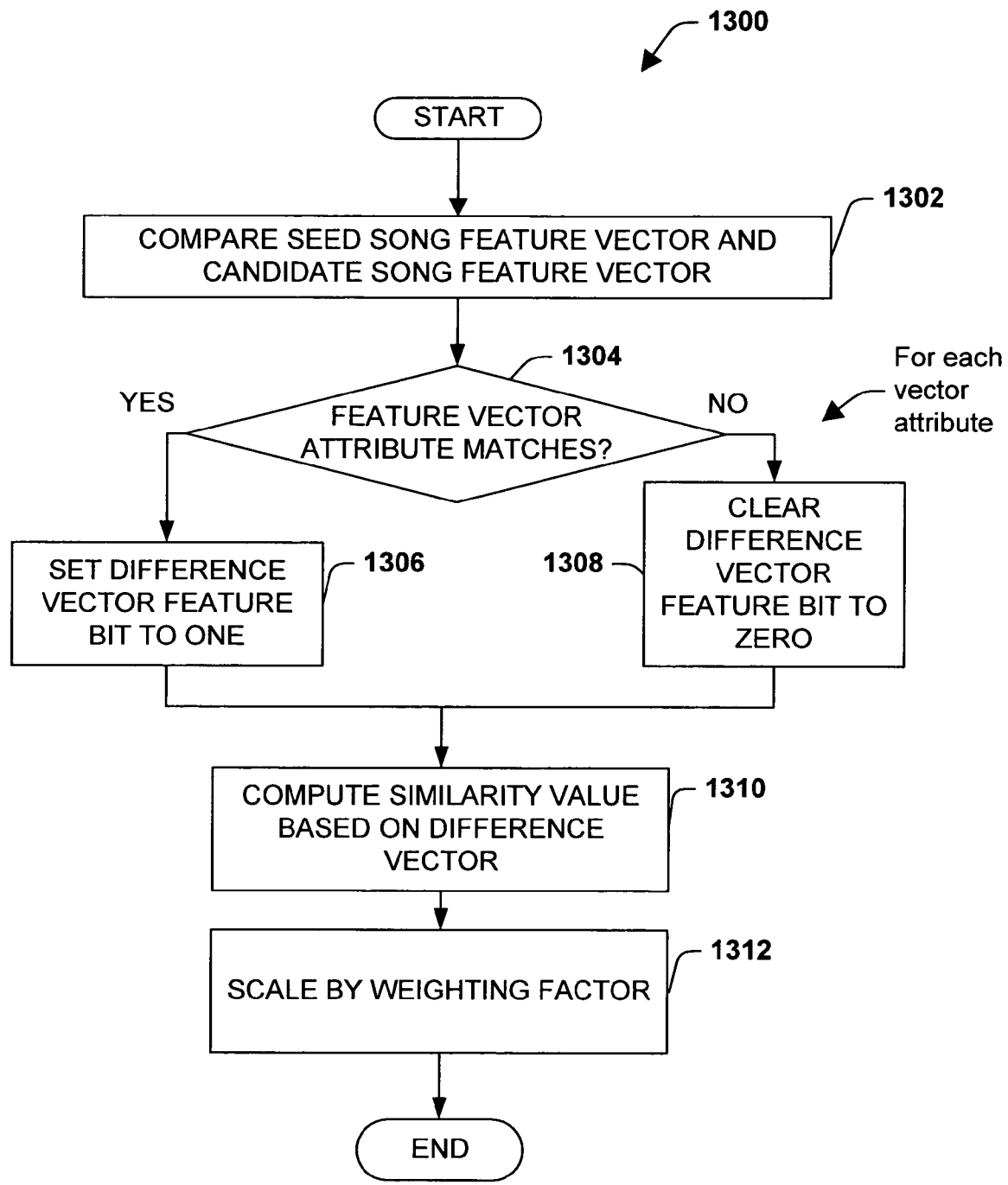
FIG. 13 is a flow diagram of a method of computing a weighted similarity value in accordance with the present invention.

FIG. 13 illustrates a method 1300 of computing a weighted similarity value based on a difference vector in accordance with an aspect of the present invention. The method 1300 operates on a media item, also referred to as a candidate item and a seed item. The method can be invoked separately for one or more seed items. At 1302, a seed item feature vector and a candidate item feature vector are compared. In one example of the present invention, the feature vectors include seven attributes, where each attribute may have one or more possible values. For example, a mood attribute can have twenty one possible values while a style attribute may have two thousand possible values. Blocks 1304, 1306 and/or 1308 can be performed for each feature attribute. Thus, at 1304, a determination is made concerning whether the seed item feature vector attributes match the candidate item feature vector attributes. If the determination at 1304 is YES, then at 1306, the bit corresponding to the compared attribute in the difference vector is set to one. If the determination at 1304 is NO, then at 1308, the bit corresponding to the compared attribute in the difference vector is cleared to zero. Thus, a difference vector that contains one binary digit for each attribute compared between the seed song feature vector and the candidate song feature vector is created.

At 1310, a similarity value can then be computed based on the difference vector. By way of illustration and not limitation, a function that accepts as an input a difference vector and produces as an output a similarity value can be employed to produce the similarity value. By way of further illustration and not limitation, a value may be retrieved from a database table by employing the difference vector as an index into the database table. While a similarity value function and a similarity value lookup are described above, it is to be appreciated that other methods for producing a similarity value from a difference vector may be employed in accordance with the present invention (e.g., treat the difference vector as a binary number corresponding to the similarity value). Then, at 1312, the similarity value is multiplied by a weighting factor. The weighting factor is generally of a range of values, such as +1 to −1 and indicates a degree of desirability or undesirability that a user has for a particular seed item.

Figure 14:
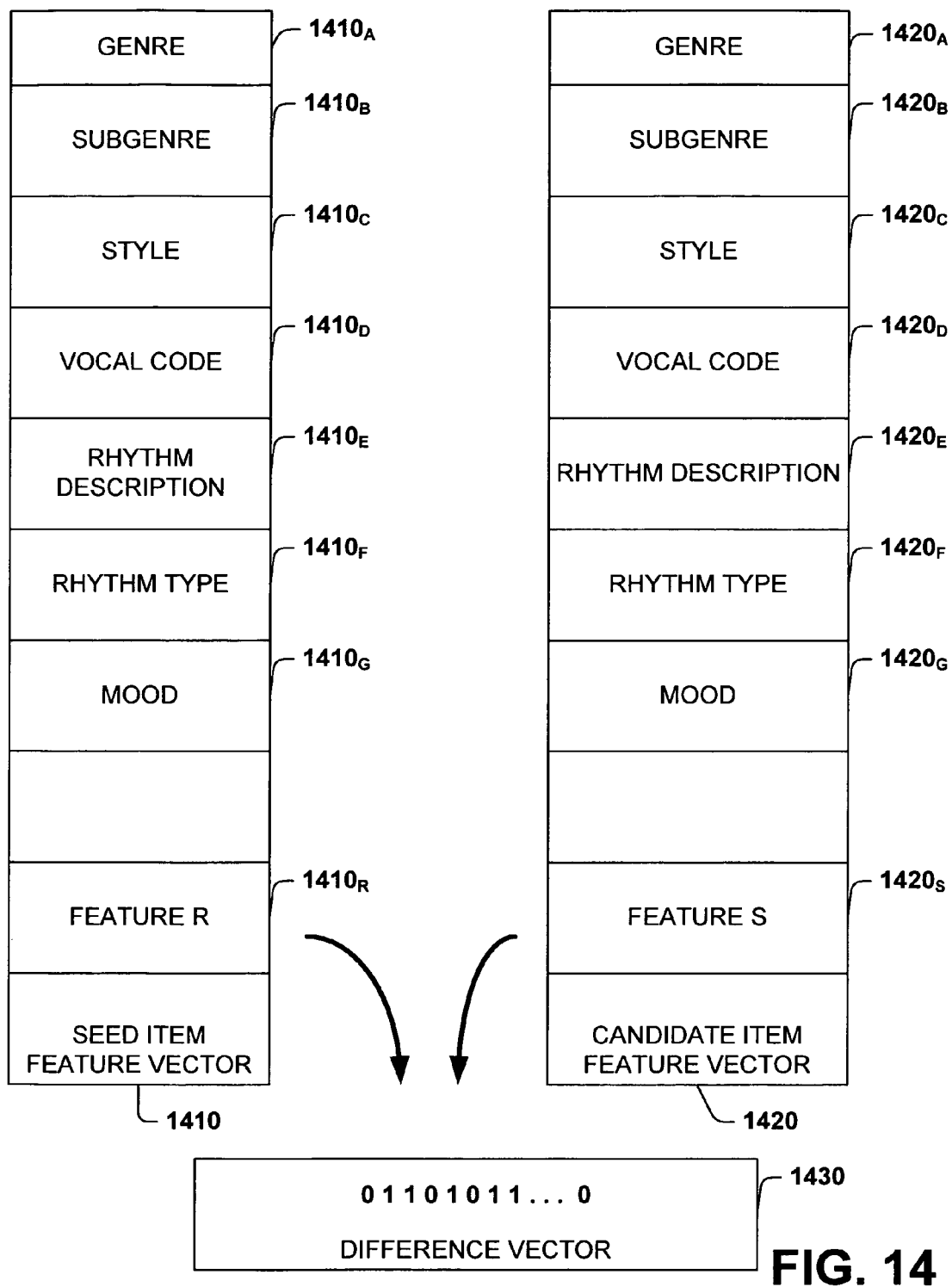
FIG. 14 is a block diagram illustrating generation of a difference vector in accordance with the present invention.

Turning now to FIG. 14, a schematic block diagram illustrating feature vectors being compared to produce a difference vector 1430 is depicted. A first feature vector 1410 may include one or more feature attributes (e.g., attributes $1410_A$ through $1410_R$, R being an integer). For example the first feature vector 1410 may include a genre attribute $1410_A$ and a subgenre attribute $1410_B$ that can be employed to facilitate characterizing a song. Similarly, a second feature vector 1420 may include one or more feature attributes (e.g., attributes $1420_A$ through $1420_S$, S being an integer). For example the second feature vector 1420 may include a genre attribute $1420_A$ and a subgenre attribute $1420_B$ that can be employed to facilitate characterizing a song. The feature vectors may be compared attribute by attribute to produce a difference vector 1430 that contains a binary digit that codes information concerning whether the feature attributes matched. Such attribute by attribute comparison may be complicated by a situation where the feature vectors contain different attributes and/or a different number of attributes. For example, the first feature vector 1410 might contain a first number R of feature attributes while the second feature vector 1420 might contain a second number S of feature attributes. Thus, one or more bits in the difference vector 1430 may code information based on a comparison of feature attributes that do not have a one to one correspondence. By way of illustration, the first feature vector 1410 may code information concerning song length into two attributes (e.g., length of song in seconds, size of song in kilobytes) while the second feature vector 1420 may code information concerning song length into one attribute (e.g., play length). Thus, setting or clearing a bit in the difference vector 1430 may involve resolving the dissimilar feature vector attributes. More specifically, if a subset of feature vectors is missing at random, the difference vector for the missing data can be set to be "1", indicating a difference.

Figure 15:
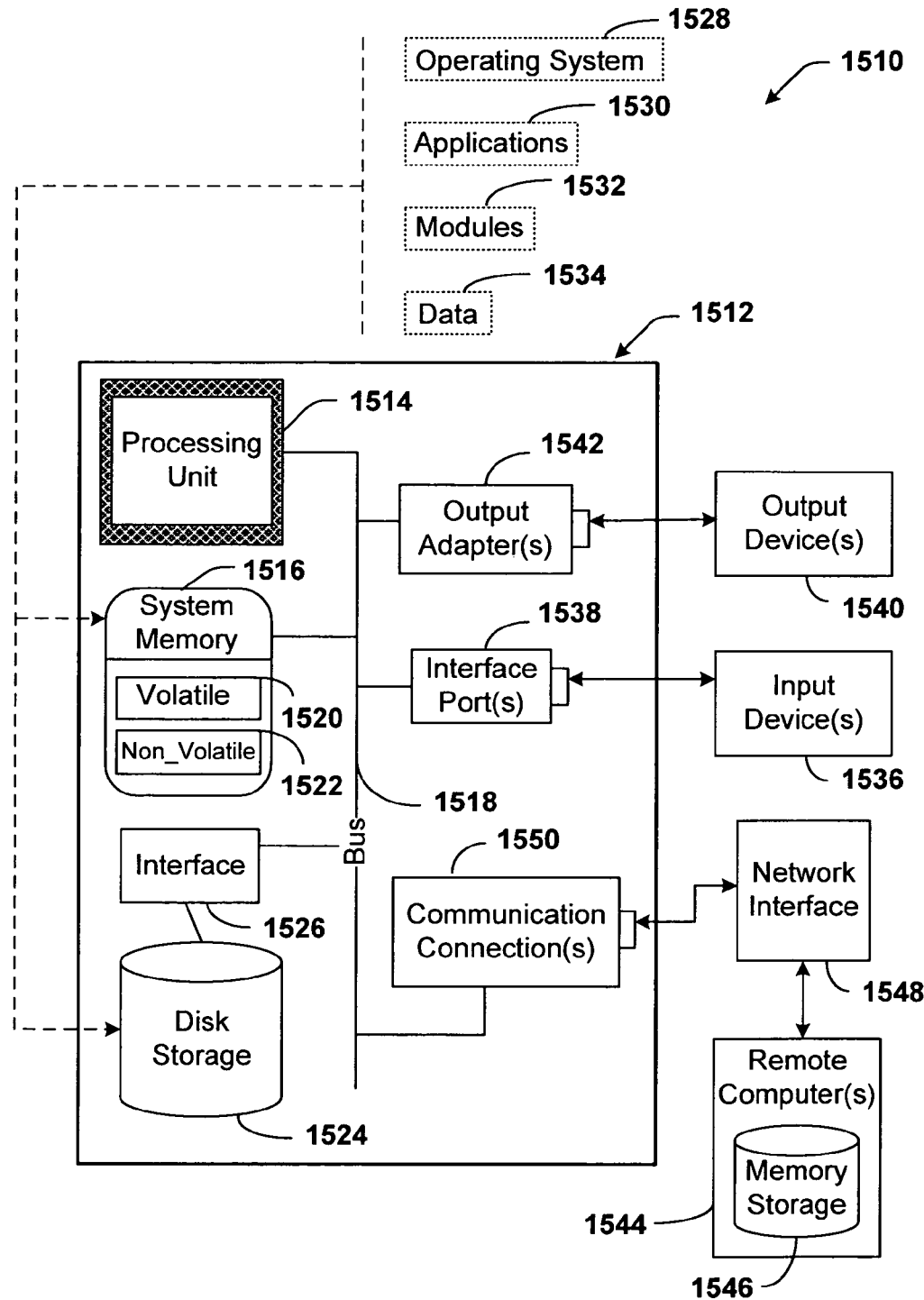
FIG. 15 is a schematic block diagram of an exemplary operating environment for a system configured in accordance with the present invention.

In order to provide additional context for various aspects of the present invention, FIG. 15 and the following discussion are intended to provide a brief, general description of a suitable operating environment 1510 in which various aspects of the present invention may be implemented. FIG. 15 provides an additional and/or alternative operating environment in which the present invention can operate. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1510 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 15, an exemplary environment 1510 for implementing various aspects of the invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 15-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/nonremovable, volatile/nonvolatile computer storage media. FIG. 15 illustrates, for example a disk storage 1524. Disk storage 1524 includes, but is not limited to, devices like a magnetic disk drive, floppy disk drive, tape drive, Jazz drive, Zip drive, LS-100 drive, flash memory card, or memory stick. In addition, disk storage 1524 can include storage media separately or in combination with other storage media including but not limited to an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. The operating system 1528, which can be stored on disk storage 1524, acts to control and allocate resources of the computer system 1512. System applications 1530 take advantage of the management of resources by the operating system 1528 through program modules 1532 and program data 1534 stored either in system memory 1516 or on disk storage 1524. It is to be appreciated that the present invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers among other output devices 1540 that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer 1544. The remote computer 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer 1544. Remote computer 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 1502.3, Token Ring/IEEE 1502.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

Figure 16:
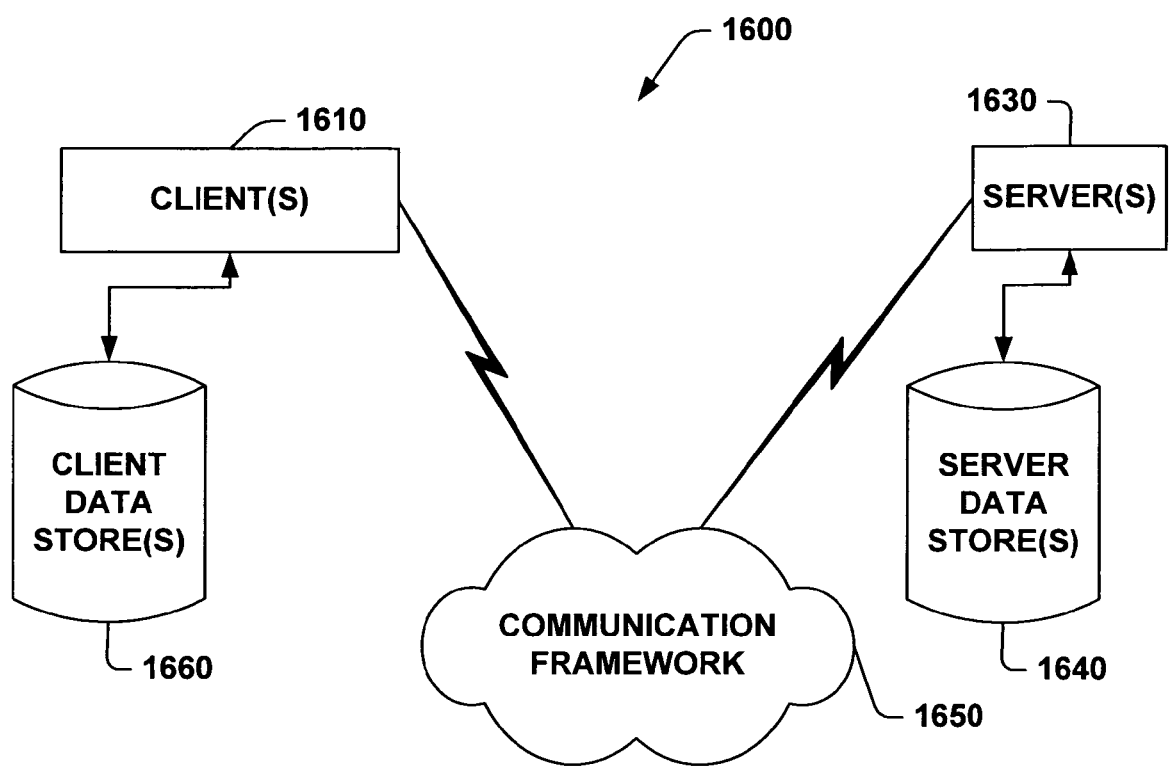
FIG. 16 is a schematic block diagram of a sample-computing environment with which the present invention can interact.

FIG. 16 is a schematic block diagram of a sample computing environment 1600 with which the present invention can interact. The system 1600 includes one or more client(s) 1610. The client(s) 1610 can be hardware and/or software (e.g., threads, processes, computing devices). The system 1600 also includes one or more server(s) 1630. The server(s) 1630 can also be hardware and/or software (e.g., threads, processes, computing devices). The servers 1630 can house threads to perform transformations by employing the present invention, for example. One possible communication between a client 1610 and a server 1630 may be in the form of a data packet adapted to be transmitted between two or more computer processes. The system 1600 includes a communication framework 1650 that can be employed to facilitate communications between the client(s) 1610 and the server(s) 1630. The client(s) 1610 are operably connected to one or more client data store(s) 1660 that can be employed to store information local to the client(s) 1610. Similarly, the server(s) 1630 are operably connected to one or more server data store(s) 1640 that can be employed to store information local to the servers 1630.

It is appreciated that the systems and methods described herein can be utilized with a variety of suitable components (e.g., software and/or hardware) and devices and still be in accordance with the present invention. Suitable components and devices include MP3 players, DVD players, portable DVD players, CD players, portable CD players, video compact disk (VCD) players, super video compact disk (SVCD) players, electronic book devices, personal digital assistants (PDA), computers, car stereos, portable telephones and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates generating a playlist comprising:

a media analyzer that receives a plurality of media seed items and obtains metadata corresponding to the plurality of seed items;

a matching component that ascertains metadata corresponding to the plurality of seed items despite varying item information based on results of an inexact matching of the metadata, the matching component creates a unique media item identifier that corresponds to the results of the inexact matching of the metadata and assigns the unique media item identifier to a media seed item; and a playlist generator that employs the metadata to determine similarity values for each of the plurality of seed items, the similarity values relatively employed to ascertain a final similarity value for a selected media item, the final similarity value utilized to generate a playlist.

2. The system of claim 1, the media seed items comprising at least one undesired media seed item.

3. The system of claim 1, the metadata of the plurality of seed items being a part of the plurality of seed items.

4. The system of claim 1, the metadata being obtained from analyzing the plurality of seed items.

5. The system of claim 1, further employing at least one user expressed weight.

6. The system of claim 5, the user expressed weight relates to a strength of positive or negative desire.

7. The system of claim 1, further employing at least one user expressed target preference.

8. The system of claim 1, further comprising a media database that maintains the collection of media items and provides metadata corresponding to the collection of media items.

9. The system of claim 8, further comprising a media player that plays media items from the collection of media items according to the playlist.

10. The system of claim 1, the playlist generator computing final similarity values for the collection of media items.

11. The system of claim 10, the playlist generator further operative to sort the playlist according to the final similarity values.

12. A user interface that facilitates playlist generation comprising:

a media library pane that displays information about a media collection and adds and removes selected tracks to and from a playlist;

an identifier pane that indicates a unique media item identifier for each track, the unique media item identifier is derived from an assessment based on inexact matching of inconsistent metadata contained in the media collection; and a playlist pane that ascertains a final similarity value of the selected tracks and displays the playlist based at least in part on the final similarity value, the playlist being regenerated on each addition and removal and being a function of the added tracks and the removed tracks, the final similarity value comprises an agglomeration of determined similarity values for each individual added track and removed track.

13. The user interface of claim 12, the playlist pane further displays removed tracks from the playlist.

14. The user interface of claim 12, the displayed information being organized hierarchically and including artist name, album name and track name.

15. The user interface of claim 12, the media library pane initiates a preview of the selected tracks.

16. The user interface of claim 12, the playlist pane clears tracks from the playlist.

17. The user interface of claim 12, the playlist pane saves the playlist to a file.

18. The user interface of claim 12, further comprising a media player that plays the tracks identified in the playlist.

19. The user interface of claim 12, the playlist pane assigns weights to the selected tracks.

20. A system that facilitates playlist generation comprising:

means for adding desirable seed items to a playlist;

means for removing undesirable seed items from the playlist;

means for employing inexact matching of incomplete metadata corresponding to the seed items that reveal an identification of the seed items;

means for assigning unique media item identifiers to media items based on the identification of the seed items; and means for generating the playlist at least in part on metadata associated with the desirable seed items and the undesirable seed items, the playlist selectively including media items similar to the desired seed item and dissimilar to the undesired seed item, the metadata utilized to generate relative similarity values for each of the desired media items and undesired seed items, the relative similarity values aggregated to form a final similarity value employed by the means for generating.

* * * * *